(12) United States Patent
Imazeki

(10) Patent No.: US 10,133,433 B2
(45) Date of Patent: Nov. 20, 2018

(54) INPUT DETECTION DEVICE AND METHOD FOR MANUFACTURING INPUT DETECTION DEVICE

(71) Applicant: Japan Display Inc., Tokyo (JP)

(72) Inventor: Yoshikatsu Imazeki, Tokyo (JP)

(73) Assignee: Japan Display Inc., Tokyo (JP)

(*) Notice: Subject to any disclaimer, the term of this patent is extended or adjusted under 35 U.S.C. 154(b) by 9 days.

(21) Appl. No.: 15/346,066

(22) Filed: Nov. 8, 2016

(65) Prior Publication Data
US 2017/0147104 A1 May 25, 2017

(30) Foreign Application Priority Data

Nov. 20, 2015 (JP) .................................. 2015-228162
Nov. 4, 2016 (JP) .................................. 2016-216245

(51) Int. Cl.
*G06F 3/044* (2006.01)
*G06F 3/041* (2006.01)

(52) U.S. Cl.
CPC ............ *G06F 3/044* (2013.01); *G06F 3/0412* (2013.01); *G06F 2203/04101* (2013.01); *G06F 2203/04103* (2013.01)

(58) Field of Classification Search
CPC ................. G06F 3/044; G06F 3/0412; G06F 2203/04103; G06F 2203/04101
See application file for complete search history.

(56) References Cited

U.S. PATENT DOCUMENTS

2014/0168152 A1 6/2014 Ishizaki et al.
2015/0122623 A1* 5/2015 Kim .................. H03K 17/9618
200/5 R

FOREIGN PATENT DOCUMENTS

JP 2014-120003 A 6/2014

* cited by examiner

*Primary Examiner* — Liliana Cerullo
(74) *Attorney, Agent, or Firm* — K&L Gates LLP

(57) ABSTRACT

According to an aspect, an input detection device includes: a first substrate; a second substrate disposed to face the first substrate, the second substrate including a main surface having an area smaller than an area of a main surface of the first substrate; and a height difference portion disposed above the first substrate. An electrode layer is disposed on the main surface of the second substrate opposite to the first substrate and on a side surface of the second substrate constituting the height difference portion.

8 Claims, 12 Drawing Sheets

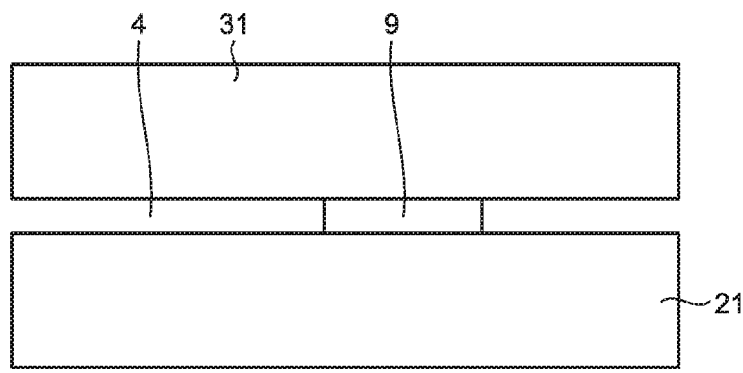
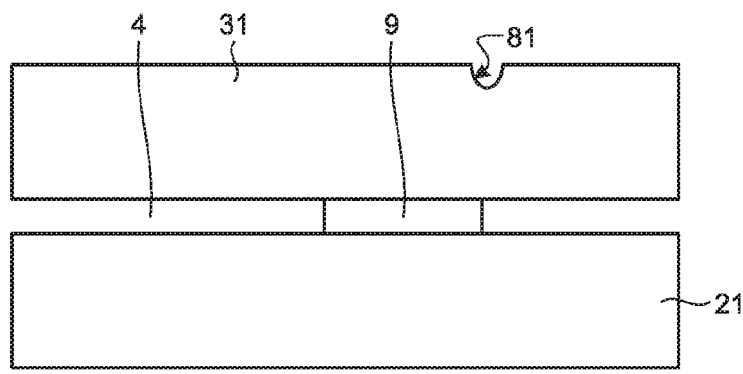
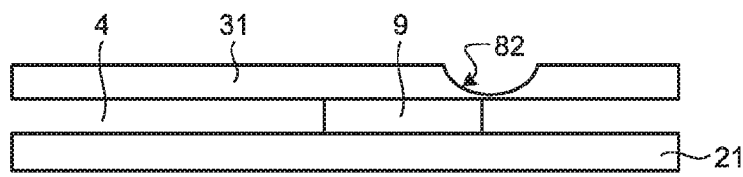
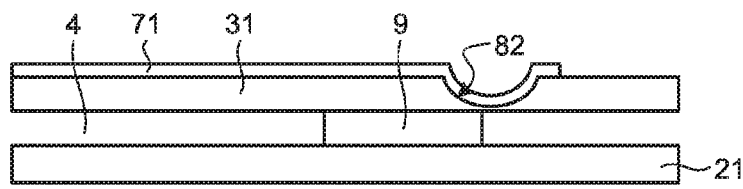
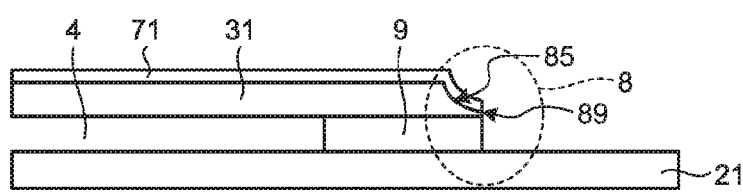
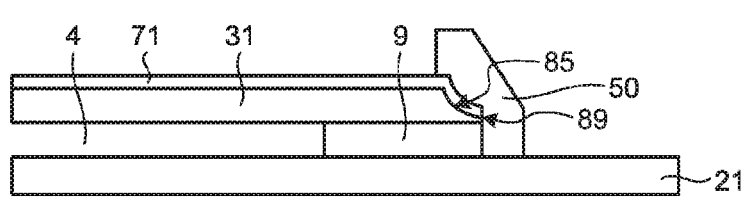

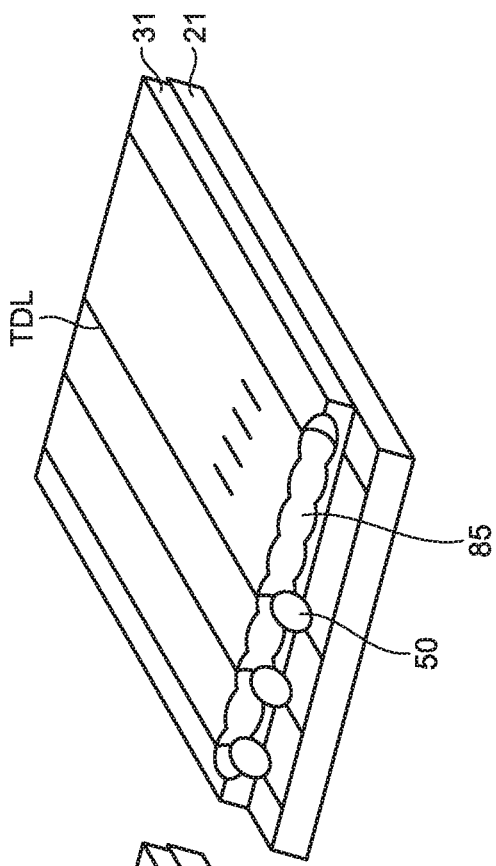
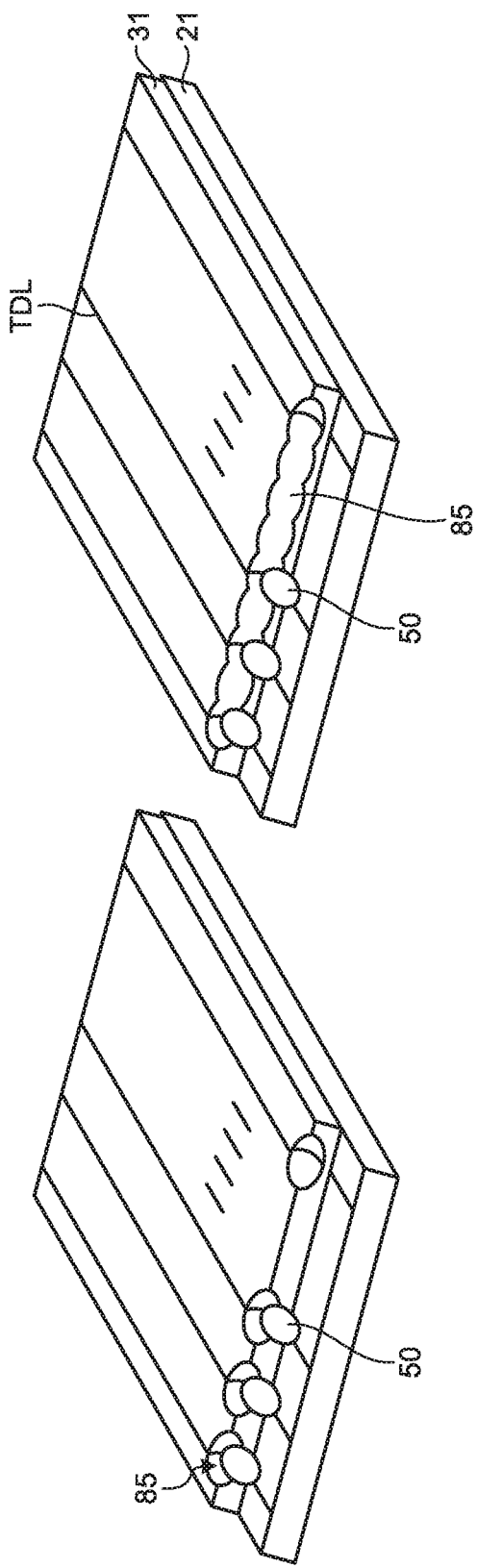

INPUT DETECTION DEVICE AND METHOD FOR MANUFACTURING INPUT DETECTION DEVICE

CROSS-REFERENCE TO RELATED APPLICATIONS

This application claims priority from Japanese Application No. 2015-228162, filed on Nov. 20, 2015, and Japanese Application No. 2016-216245, filed on Nov. 4, 2016, the contents of which are incorporated by reference herein in its entirety.

BACKGROUND

1. Technical Field

The present invention relates to an input detection device capable of detecting an external proximity object and a method for manufacturing the input detection device.

2. Description of the Related Art

Input detection devices capable of detecting an external proximity object, or so-called touch panels have recently been attracting attention. A display device with a touch detection function that is a display device on which a touch panel is stacked is generally known. As for a small device such as a mobile phone and a tablet, the reduction in device thickness and the simplification of the manufacturing process are especially required.

As a technique for thinning the device and simplifying the manufacturing process, for example, it can be considered that a touch detection electrode is directly formed on the counter substrate of the liquid crystal cell filled with liquid crystals. This configuration saves the space for another substrate for a touch panel and also saves time and effort to provide the substrate.

However, the device described above requires flexible substrates on which, for example, various control circuits and a power source are installed on both the pixel substrate and the counter substrate. There is a problem that the two or more flexible substrates physically interfere with each other or need space in the device.

In consideration of the above, Japanese Patent Application Laid-open Publication No. 2014-120003 (JP-A-2014-120003) discloses a technique of using conductive paste to couple a detection electrode on the counter substrate to a terminal on the pixel substrate.

JP-A-2014-120003 further discloses as an embodiment that the end surface of the height difference portion of the counter substrate is obliquely scribed.

In the above-described technique, improvement in coupling stability between an electrode on the counter substrate and a terminal on the pixel substrate has been desired.

For the foregoing reasons, there is a need for an input detection device that is excellent in coupling stability between the electrode on the counter substrate and a terminal on another substrate.

SUMMARY

According to an aspect, an input detection device includes: a first substrate; a second substrate disposed to face the first substrate, the second substrate including a main surface having an area smaller than an area of a main surface of the first substrate; and a height difference portion disposed above the first substrate. An electrode layer is disposed on the main surface of the second substrate at an opposite side to the first substrate, and on a side surface of the second substrate constituting the height difference portion.

According to another aspect, a method for manufacturing an input detection device includes the steps of: sticking a first substrate and a second substrate together with a sealing member; and forming an electrode layer on a main surface and a side surface of the second substrate.

BRIEF DESCRIPTION OF THE DRAWINGS

FIGS. 15A to 15F are explanatory diagrams each illustrating a general outline of a manufacturing method according to the present embodiment;

FIGS. 16A and 16B are perspective views of the input detection device after a conductive body is formed in the input detection device.

DETAILED DESCRIPTION

Figure 1:
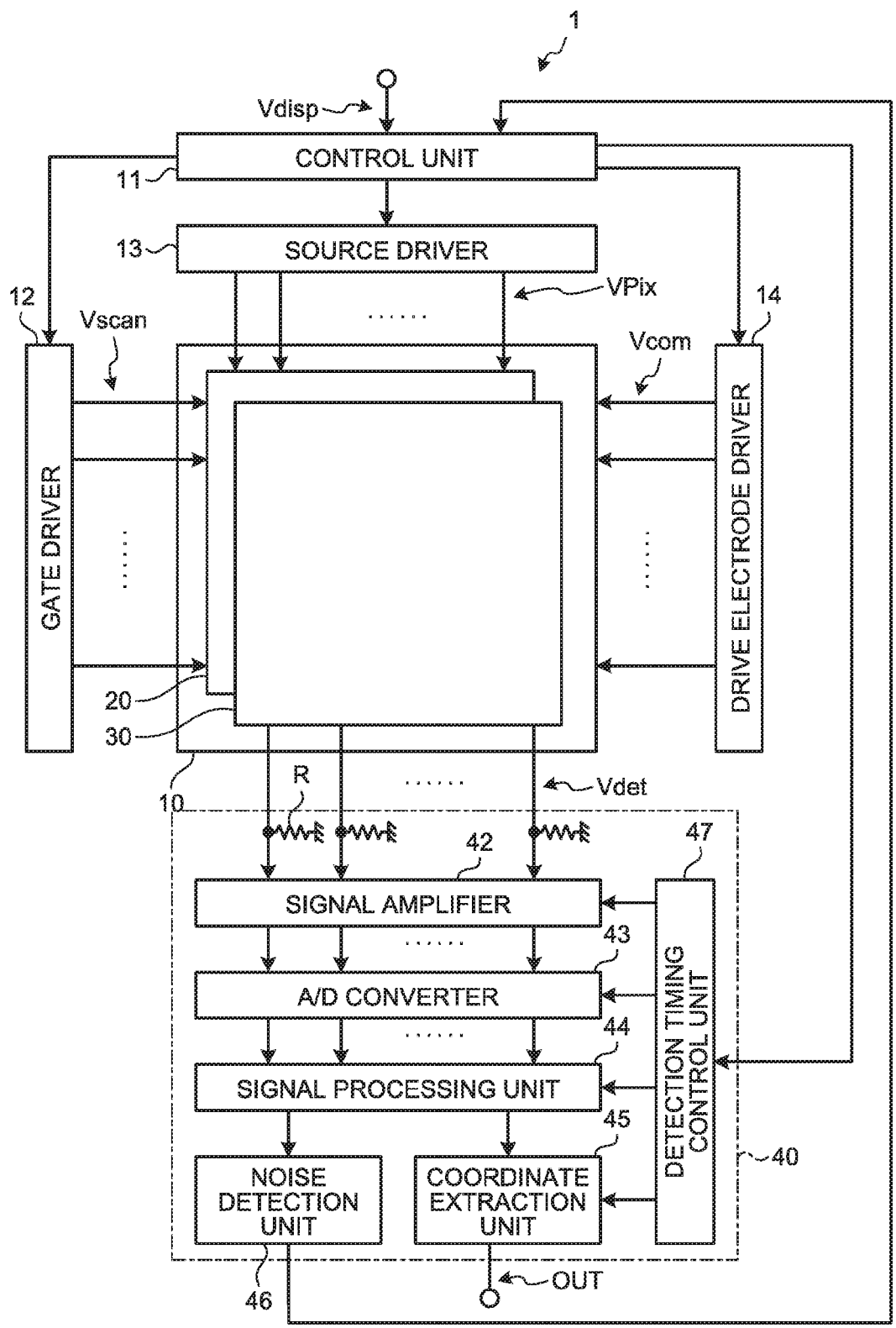
FIG. 1 is a diagram illustrating an exemplary configuration of an input detection device according to an embodiment of the present invention.

Modes (embodiments) for carrying out the present invention will be described below in detail with reference to the drawings. The contents described in the embodiments are not intended to limit the present invention. Components described below include components easily conceivable by those skilled in the art and components substantially identical therewith. Furthermore, the components described below can be appropriately combined. The disclosure is given by way of example only, and various changes made without departing from the spirit of the invention and easily conceivable by those skilled in the art naturally fall within the scope of the invention. The drawings may possibly illustrate the width, the thickness, the shape, and other elements of each unit more schematically than the actual aspect to simplify the explanation. These elements, however, are given by way of example only and are not intended to limit interpretation of the invention. In the specification and the figures, components similar to those previously described with reference to a preceding figure are denoted by like reference numerals, and overlapping explanation thereof will be appropriately omitted.

1-1. Overall Configuration

FIG. 1 is a diagram illustrating an exemplary configuration of an input detection device according to an embodiment of the present invention.

An input detection device 1 includes: a display device 10 with an input detection function including an input detection device 30 and a display device 20; a gate driver 12; a source driver 13; a drive electrode driver 14; a control unit 11 that controls the drivers; and a touch detection unit 40.

In the present configuration, some components of the input detection device 30 and the display device 20 are shared. The present embodiment has an in-cell structure in which the common electrode is used as a common electrode for display and a drive electrode for detecting input.

The control unit 11 operates the gate driver 12, the source driver 13, the drive electrode driver 14, and the touch detection unit 40 in synchronization with one another.

During a video display period in which a video is displayed, in accordance with a video signal Vdisp transmitted from the outside to the control unit 11, a scanning signal Vscan is sequentially provided from the gate driver 12 to the selected horizontal lines. Meanwhile, a pixel signal VPix is provided to each selected pixel from the source driver 13, and a drive signal Vcom for display is provided from the drive electrode driver 14 to the drive electrode (common electrode) COML.

During an input detection period in which input is detected, a drive signal Vcom for detecting input is provided from the drive electrode driver 14 to the drive electrode COML. Meanwhile, the touch detection unit 40 outputs a detection signal from an input detection electrode TDL included in the input detection device 30 (see FIG. 5).

Examples of the touch detection unit 40 include, but are not limited to, a signal amplifier 42, an A/D converter 43, a signal processing unit 44, a coordinate extraction unit 45, a noise detection unit 46, and a detection timing control unit 47.

The control unit 11 can perform, for example, noise correction in accordance with a detection result from the touch detection unit 40 as necessary.

In the present embodiment, the input detection device can employ not only the in-cell structure described above, but also an on-cell structure in which both the detection electrode and the drive electrode are provided on the counter substrate, and a self-capacitance on-cell structure in which input is detected only by the detection electrode disposed on the counter substrate.

1-2. Touch Detection Principle

An aspect of the touch detection principle according to the present embodiment will be described below.

The present embodiment employs the principle of capacitive touch detection.

Figure 2:
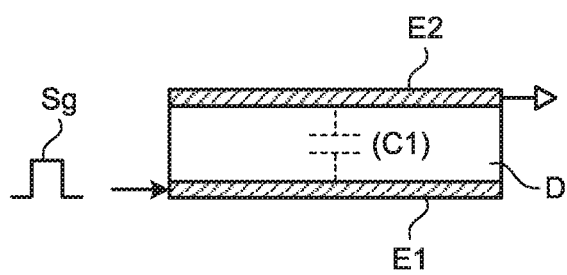
FIG. 2 is a diagram illustrating a state in which a conductor such as a finger and a support is not in contact with or close to an input device.
Figure 3:
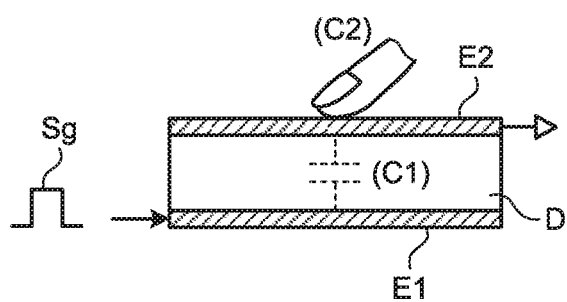
FIG. 3 is a diagram illustrating a state in which a conductor is in contact with or close to the input device.

FIG. 2 is a diagram illustrating a state in which a conductor such as a finger and a support is not in contact with or close to the input device. FIG. 3 is a diagram illustrating a state in which a conductor is in contact with or close to the input device.

As illustrated in FIG. 2, a capacitance element C1 is formed between a pair of electrodes E1 and E2 facing each other. The electrodes E1 and E2 hold a dielectric body D therebetween and are electrically separate from each other.

The electrode E1 is used as a drive electrode to which a drive signal for detecting a touch is applied, and a drive signal Sg (Vcom that is applied to the common electrode during a touch period in the present embodiment) is applied to the electrode E1. Meanwhile, the electrode E2 is grounded as a detection electrode via a resistor and coupled to the touch detection unit 40.

When an alternating-current signal at a predetermined frequency is supplied as a drive signal Sg to the electrode E1 in a state where a finger is not in contact with the electrode E2, a current corresponding to the capacitance of the capacitance element C1 illustrated in FIG. 2 flows in accordance with the charge and discharge of the capacitance element C1, and the electrode E2 outputs a predetermined detection signal (Vdet in FIG. 4) in accordance with the value of the flowing current.

On the other hand, when a finger is in contact with the electrode E2, a capacitance element C2 generated by the finger is added to the capacitance element C1 in series. Thus, when the drive signal Sg is supplied to the electrode E1, a current corresponding to the capacitance element C1 and the capacitance element C2 flows from the electrode E2. The value of the current is lower than the value of the current corresponding to only the capacitance element C1. Thus, the voltage value of the detection signal Vdet detected from the electrode E2 is lower than the voltage value of the detection signal Vdet when the finger is not in contact with the electrode E2.

Figure 4:
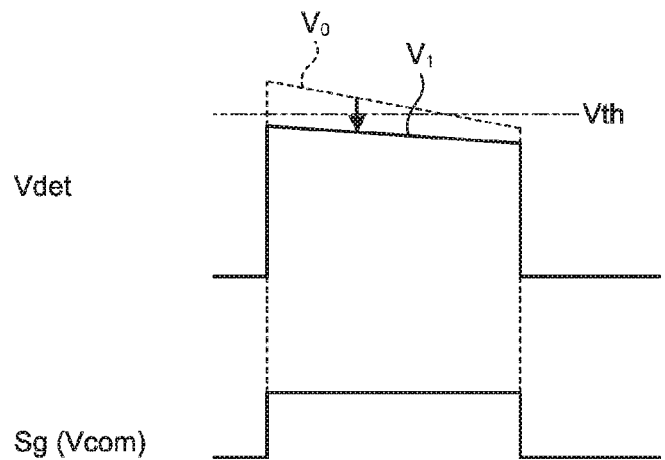
FIG. 4 is a schematic diagram for explaining the principle of determining proximity or contact of the object in accordance with a detection signal of the input detection device.

FIG. 4 is a schematic diagram for explaining the principle of determining proximity or contact of an object in accordance with the detection signal of the input detection device. As illustrated in FIG. 4, the voltage value of the detection signal Vdet when a finger is not in contact with the electrode E2 is $V_0$, and the voltage value of the detection signal Vdet when a finger is in contact with the electrode E2 is $V_1$. By distinguishing between the voltage values in accordance with an arbitrary threshold Vth, it is determined whether a finger is in contact with the electrode E2.

The principle of the input detection device of a mutual-capacitance technology has been described in the present embodiment. However, the principle of detection by a self-capacitance technology can be employed in the present embodiment. In the self-capacitance technology, the drive signal Sg is applied to the electrode E2. Then, the electrode E2 is decoupled from the source of the drive signal, and coupled to the detection unit so that a detection waveform Vdet including the variations in capacitance of the electrode E2 is output. In such a case, input can be detected only by a touch detection electrode layer.

The principle of detection by the input detection device of the present embodiment is not limited to the principles described above. Another principle of detection can be employed.

1-3. Exemplary Configuration of Input Detection Device

Figure 5:
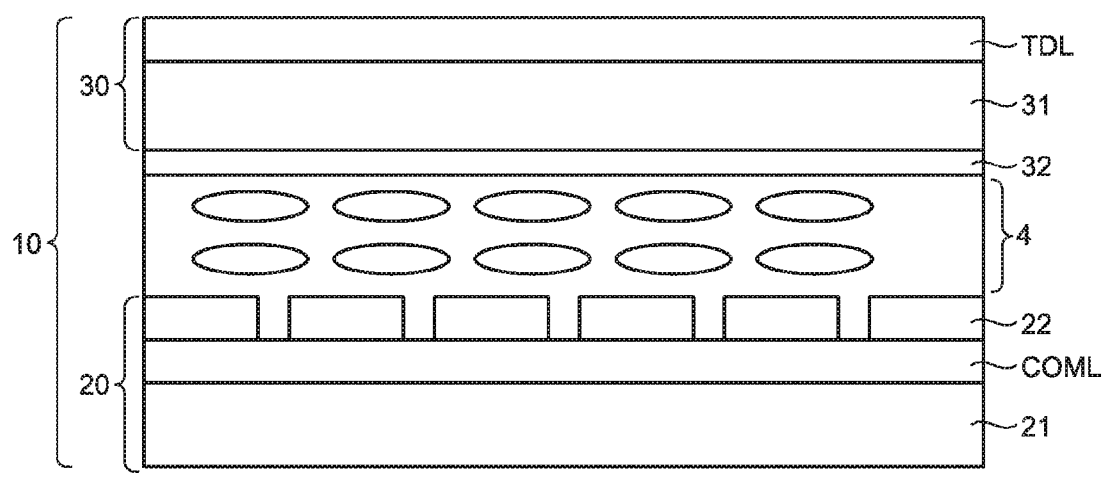
FIG. 5 is a cross-sectional view of the main parts of the input detection device according to the present embodiment.
Figure 6:
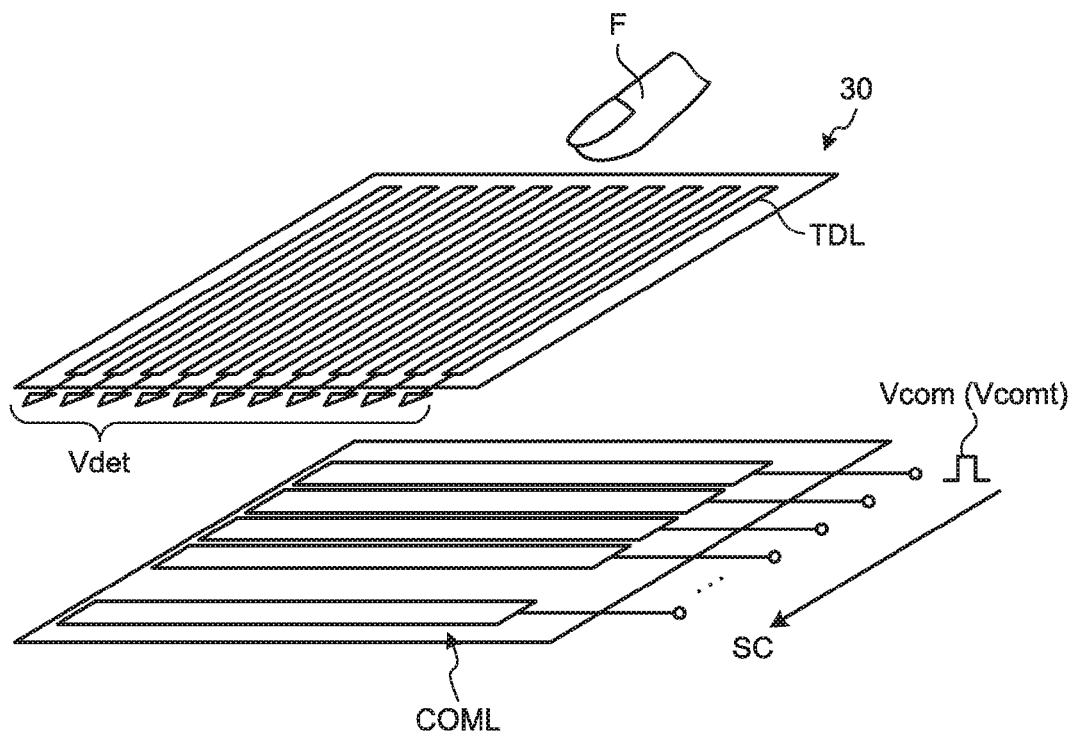
FIG. 6 is a diagram illustrating an exemplary configuration of the input detection device according to the present embodiment.

FIG. 5 is a cross-sectional view of the main parts of the input detection device according to the present embodiment. FIG. 6 is a diagram illustrating an exemplary configuration of the input detection device according to the present embodiment.

The display device 10 with an input detection function includes a pixel substrate 21 as a first substrate, a counter substrate 31 as a second substrate facing the pixel substrate 21, and a liquid crystal layer 4 filled with liquid crystals and interposed between the pixel substrate 21 and the counter substrate 31.

Common electrodes COML and pixel electrodes 22 arranged in a matrix are formed on the surface of the pixel substrate 21. Wires such as pixel signal lines that transmit a pixel signal VPix to the respective pixel electrodes 22, and scanning signal lines that drive thin film transistors provided on the respective pixels, are also formed on the pixel substrate 21. Wires that provide a drive signal to the respective common electrodes COML are also formed.

Input detection electrodes TDL that detects contact or proximity of an object (conductor) F such as a finger, and a color filter 32 are formed on the counter substrate 31.

In the present embodiment, as illustrated in FIG. 6, the drive electrodes (common electrodes) COML and the input detection electrodes TDL are patterned in a stripe-shape and arranged facing each other such that capacitance is formed in crossing portions in which the drive electrodes (common electrodes) COML three-dimensionally cross the respective input detection electrodes TDL.

The shapes of the drive electrodes (common electrodes) COML and the input detection electrodes TDL are not limited to stripes and can be formed in an arbitrary pattern.

A dummy electrode or a guard electrode can be arranged in the same layer as that of the input detection electrode TDL. For example, any one of floating potential, ground potential, and an alternating-current signal in synchronization with the drive electrode can be applied to the dummy electrode and the guard electrode. For example, an opening can be arbitrarily provided on the input detection electrode TDL.

For example, the pattern shapes or materials disclosed in Japanese Patent Application Laid-open Publication No. 2014-191660 and Japanese Patent Application Laid-open Publication No. 2014-191650 can be used as the pattern shape or material of the input detection electrodes TDL according to the present embodiment. Alternatively, another publicly known electrode pattern or material can be used.

Each of the input detection electrodes TDL is coupled via a wire to the touch detection unit 40. When the drive signals Vcom are supplied to the respective common electrodes COML arranged in a scanning direction SC on the pixel substrate 21 during the touch period, the input detection electrodes TDL output the detection signals Vdet to the touch detection unit 40 in response to the supply of the drive signal Vcom.

Figure 7:
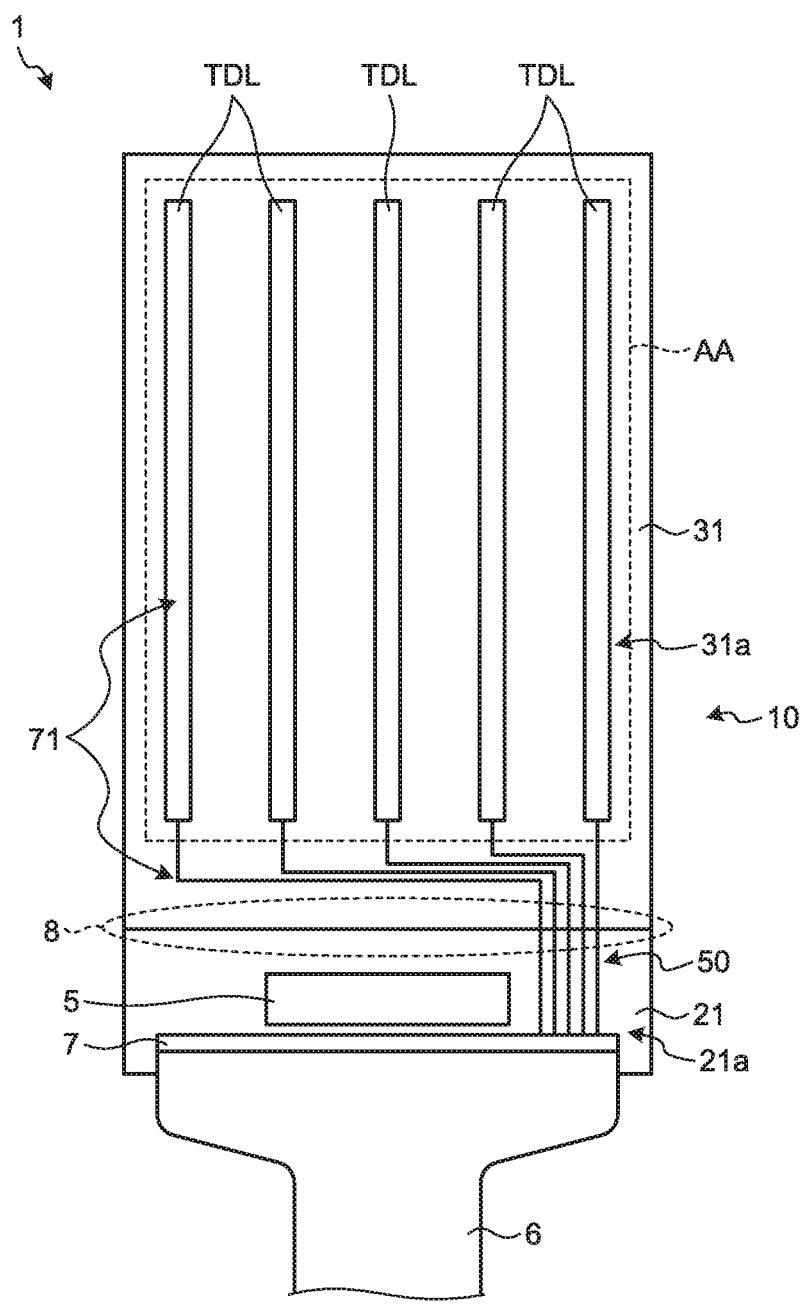
FIG. 7 is a plan view of the input detection device according to the present embodiment.

1-4. Coupling Structure of Wires for Obtaining Detection Signal from Input Detection Electrodes FIG. 7 is a plan view of the input detection device according to the present embodiment. Examples of an electronic component 5 illustrated in FIG. 7 include, but not are limited to, at least one of the gate driver 12, the source driver 13, and the drive electrode driver 14 illustrated in FIG. 1. The electronic component 5 is provided on the pixel substrate 21 by the chip on glass (COG) technology. The electronic component 5 is controlled in accordance with the control signal from the control unit 11 illustrated in FIG. 1.

In the present embodiment, as illustrated in FIG. 7, the input detection electrodes TDL included in the display device 10 with an input detection function are formed in a region overlapping with a display region AA on a main surface 31a of the counter substrate 31 in a planar view. In a frame region positioned outside of the display region AA, electrodes are formed in the same layer as that of the input detection electrodes TDL, and are electrically coupled to the input detection electrodes TDL. The electrodes in the frame region are formed in the same layer as that of the input detection electrodes TDL until the side surface at the end of the counter substrate 31 where the counter substrate 31 and the pixel substrate 21 constitute a height difference portion 8. An electrode layer 71 formed in the frame region and on the side surface of the counter substrate 31 can function as wiring of the input detection electrodes TDL formed in the display region AA. The electrode pattern in the frame region or on the side surface of the counter substrate 31 is narrower in width than the electrode pattern in the display region AA. In the height difference portion 8, a conductive body 50 is formed on the input detection electrodes TDL formed on the side surface of the counter substrate 31. The conductive body 50 electrically couples the input detection electrodes TDL to a terminal group 7 on the pixel substrate 21. In the present embodiment, the conductive body 50 is conductive paste, for example, made of a resin composition including a conductive substance such as silver. The terminal group 7 is electrically coupled to a flexible printed circuit (FPC) substrate 6 coupled to the pixel substrate 21.

Various circuits that control, for example, the control circuit on the pixel substrate 21 are mounted on the FPC substrate 6. The touch detection unit 40 is mounted on the FPC substrate 6 so that the touch detection unit 40 is directly coupled to the input detection electrodes TDL. Thus, the control of the display operation and the control of the input detection operation can be performed in the single FPC substrate 6. This configuration can thin and downsize the device.

Figure 8:
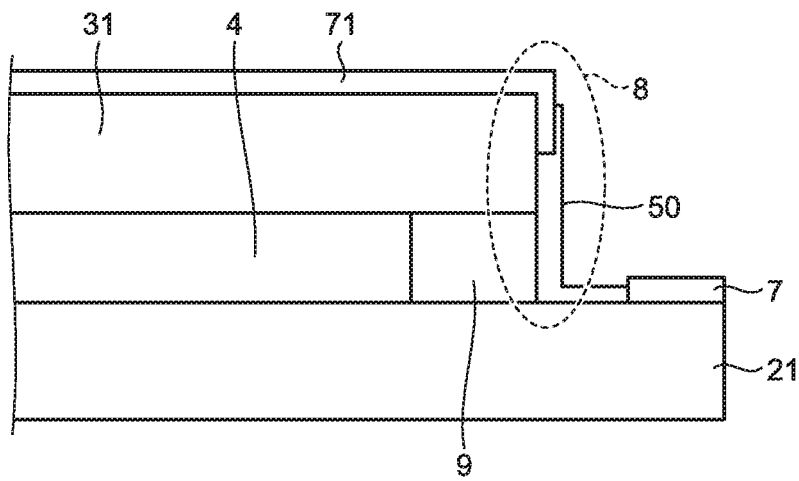
FIG. 8 is a cross-sectional view of a coupling structure of wiring for an input detection electrode according to the present embodiment.

FIG. 8 is a cross-sectional view of the coupling structure of wiring for the input detection electrodes according to the present embodiment. As illustrated in FIG. 7, the area of the main surface 31a of the counter substrate 31 is smaller than the area of a main surface 21a of the pixel substrate 21 so that the main surface 31a does not overlap with the electronic component 5 on the pixel substrate 21. As illustrated in FIG. 8, the height difference portion 8 is formed at the portion overlapping with the pixel substrate 21 at the end of the counter substrate 31 in a planar view.

The height difference portion 8 is disposed above the pixel substrate 21, and is constituted of a plurality of elements having different heights in a height direction perpendicular to the main surface 21a of the pixel substrate 21, the elements including a portion of the main surface 21a of the pixel substrate 21, the conductive body 50 disposed on the pixel substrate 21, and the input detection electrodes TDL formed on the main surface 31a of the counter substrate 31. The height difference portion 8 includes the side surface of the counter substrate 31. On the side surface of the counter substrate 31 where the height difference portion 8 is positioned, the electrodes are provided in the same layer as that of the input detection electrodes TDL formed on the main surface 31a of the counter substrate 31.

Furthermore, the conductive body 50 is disposed on the electrodes formed on the side surface so that the conductive body 50 electrically couples the electrodes to the terminal group 7 formed on the pixel substrate 21. The drive electrodes (common electrodes) (not illustrated) are disposed, for example, on the pixel substrate 21. The drive electrodes may be stacked on the pixel electrodes or may be formed in the same layer as that of the pixel electrodes. The drive electrodes may be formed on the counter substrate 31.

In the present embodiment, the electrodes in the same layer as that of the input detection electrodes TDL are formed on the side surface of the counter substrate 31. This configuration decreases the distance between the input detection electrodes TDL and the terminal group 7 formed on the pixel substrate 21. This configuration can suppress the disconnection of the conductive body 50 when the input detection electrodes TDL and the terminal group 7 are coupled via the conductive body 50.

Figure 9:
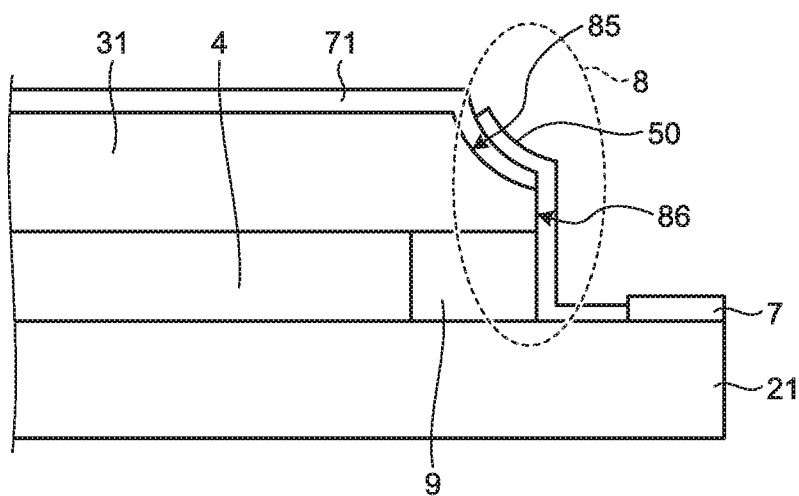
FIG. 9 is a diagram illustrating a modification of the present embodiment.

FIG. 9 is a diagram illustrating a modification of the present embodiment. In the modification, at least a part of the side surface of the counter substrate 31 has an inclined surface in the height difference portion. In other words, the side surface of the counter substrate 31 includes an inclined surface 85 and a vertical surface 86 without an inclination. The vertical surface includes the side surface of the counter substrate 31 and a sealing member 9.

Furthermore, the inclined surface 85 includes a curved surface.

The electrodes included in the same layer as that of the electrodes disposed on the main surface 31a of the counter substrate 31 are disposed at least at a part of the inclined surface 85 in the present modification. The conductive body 50 is formed on the electrodes disposed at least on the inclined surface 85 so that the conductive body 50 electrically couples the electrodes to the terminal group 7.

In the present modification, the side surface at the end of the counter substrate constituting the height difference portion 8 includes the inclined surface 85, which decreases the thickness of the counter substrate 31 toward the outside. Thus, the conductive body 50 can be formed along the inclined surface 85. This configuration improves the stability of coupling between the electrodes and the conductive body 50 on the inclined surface 85. The side surface of the counter substrate 31 includes the inclined surface 85. This configuration can facilitate forming electrodes on the side surface of the counter substrate 31 and in the same layer as that of the main surface 31a of the counter substrate 31. This also improves the stability of coupling of the electrodes and the counter substrate 31.

It is preferable in the present embodiment that the electrodes formed on the side surface of the counter substrate 31 are formed in the same process as that of forming the input detection electrodes TDL on the main surface 31a of the counter substrate 31, and the electrodes on the main surface 31a and the side surface of the counter substrate 31 are made of the same material and are formed continuously.

It is preferable in the present embodiment that the electrodes formed on the side surface of the counter substrate 31 are formed in the same process as that of forming the input detection electrodes TDL on the main surface 31a of the counter substrate 31, and the electrodes on the main surface 31a and the side surface of the counter substrate 31 have substantially the same thickness.

Liquid crystals are filled between the pixel substrate 21 and the counter substrate 31, and sealed with the sealing member 9.

The display function layer provided between the pixel substrate 21 and the counter substrate 31 is not limited to the liquid crystal layer 4, and may be an organic EL layer.

In such a case, another material may be arbitrarily employed as a material corresponding to the sealing member 9.

The conductive body 50 only needs to be formed at least on the side surface at the end of the counter substrate 31, and is not necessarily formed on the main surface 31a of the counter substrate 31. Thus, the thickness of the input detection device does not increase due to the thickness of the conductive body 50.

The conductive body 50 may be formed also on the main surface 31a of the counter substrate 31 as necessary.

Figure 10:
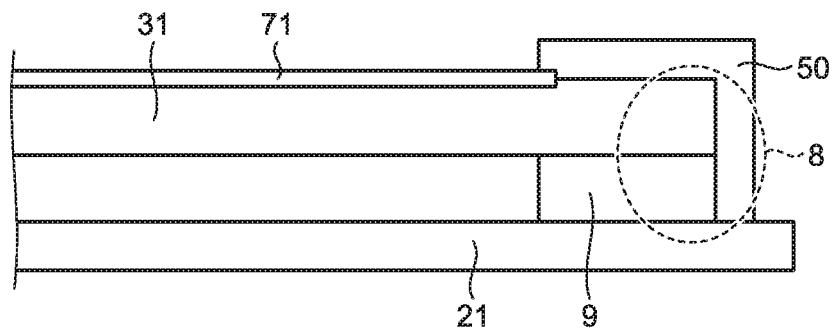
FIG. 10 is a diagram illustrating a comparative example.

FIG. 10 is a diagram of a comparative example.

In FIG. 10, the input detection electrodes TDL or the wires included in the same layer as that of the input detection electrodes TDL are formed only on the main surface 31a of the counter substrate 31. In order to electrically couple the input detection electrodes to the pixel substrate 21, it is necessary to form conductive paste on the main surface 31a of the counter substrate 31.

In such a coupling structure, the distance between the electrode layer 71 and the pixel substrate 21 is long. Thus, it is necessary to discharge a large amount of a conductive body in order to electrically couple the electrode layer 71 to the pixel substrate 21. This may cause electric short circuit or disconnection, which deteriorates the stability of coupling.

Figure 11:
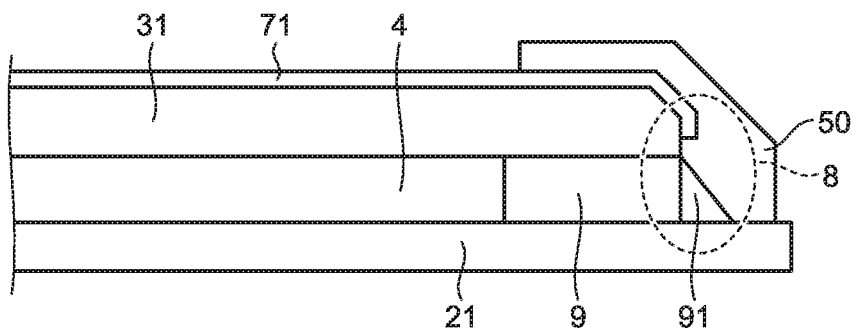
FIG. 11 is a diagram illustrating a second modification of the present embodiment.

FIG. 11 is a diagram illustrating a second modification of the present embodiment. In the second modification, a height difference absorption layer 91 is provided outside the sealing member in the height difference portion 8, and thus the conductive body 50 is formed to have a portion inclined from the counter substrate 31 toward the pixel substrate 21, and having a predetermined angle with respect to the pixel substrate 21. The predetermined angle is lower than 90°. Alternatively, the conductive body 50 may be formed to have the inclined portion having the predetermined angle by making the sealing member 9 protrude from the counter substrate 31.

When there is a gap between the pixel substrate 21 and the sealing member 9, there is a possibility of the conductive paste entering into the gap by capillary action depending on the compositions or viscosity of the conductive paste. Providing the height difference absorption layer 91 as described above can solve such a problem.

Figure 12:
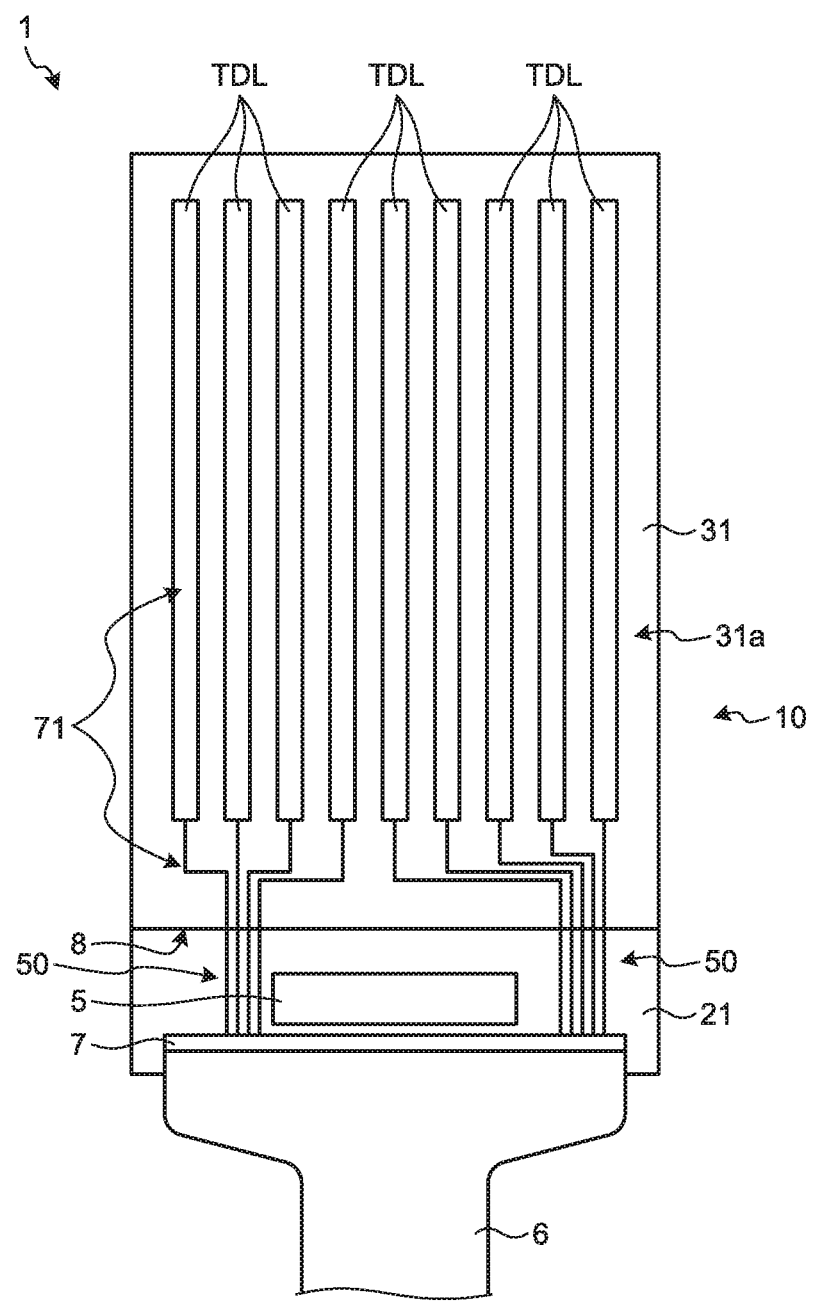
FIG. 12 is a diagram illustrating another example of routing wires using conductive paste.

FIG. 12 is a diagram illustrating another example of routing the wires using conductive paste. A way to route the wires with conductive paste may be such that the wires of all the input detection electrodes TDL are gathered in one place. Alternatively, for example, the wires may be divided and routed into two places to avoid the electronic component 5 (COG) as illustrated in FIG. 12. Alternatively, another way to route the wires can be employed.

The inclined surface of the side surface at the end of the counter substrate 31 according to the present embodiment is formed only in the place where the wires are routed with the conductive paste. It is unnecessary to form the inclined surface in a place where the wires are not routed.

In the present embodiment, the inclined surface 85 can be formed only in a desired region because the inclined surface 85 of the counter substrate 31 is formed with a new manufacturing method as described below.

Figure 13:
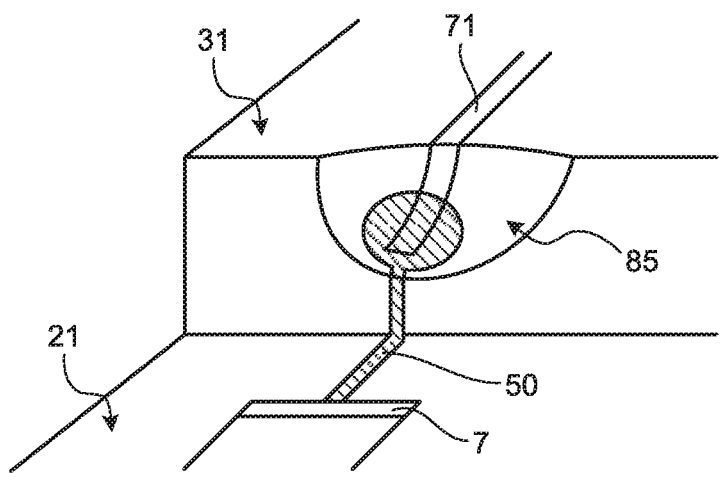
FIG. 13 is a diagram illustrating an exemplary coupling structure using the conductive paste.

FIG. 13 is a diagram illustrating an exemplary coupling structure of the conductive paste.

In FIG. 13, an electrode included in the same layer as that of a single input detection electrode TDL is disposed on the inclined surface 85.

Forming the electrode at the steepest part in the center of the inclined surface 85 makes it easy to route the wiring using the conductive paste on the pixel substrate 21 by using gravity and the inclined surface 85 when the conductive paste is discharged from above the part. This configuration reduces, for example, the short circuit, and improves the stability of coupling between the electrode and the conductive paste.

Figure 14:
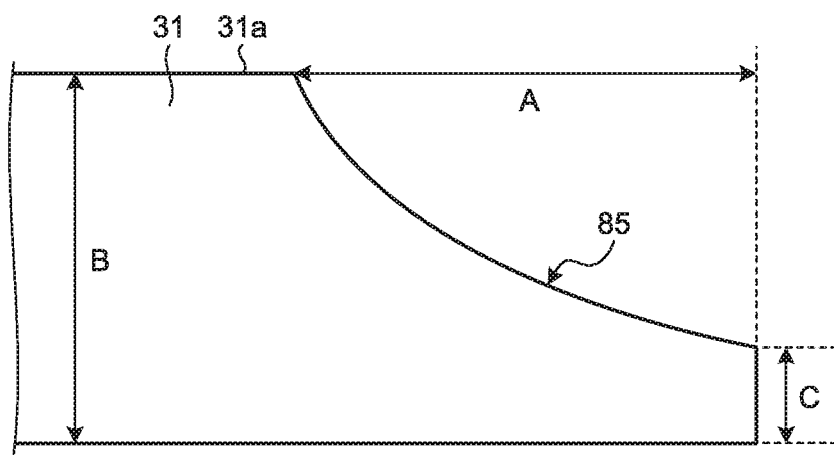
FIG. 14 is a diagram illustrating exemplary dimensions of a height difference portion of a counter substrate having an inclined surface.

Various coupling structures using the conductive paste other than the structure described above can be employed. FIG. 14 is a diagram illustrating exemplary dimensions of the height difference portion 8 of the counter substrate 31 including the inclined surface 85. A distance A from the position where the inclined surface 85 is formed on the main surface 31a of the counter substrate 31 to the end of the counter substrate 31 is preferably within a range from 50 µm to 1 mm.

A thickness B of the thickest part of the counter substrate 31 is preferably within the range from 50 µm to 1 mm A thickness C of the thinnest part is preferably within the range from 5 µm to 30 µm. The longer the distance A is, the better the stability of coupling among the electrode, the conductive body 50, and a terminal of the terminal group 7 is. However, too long distance A may increase the frame region of the input detection device 1.

The thinner the thickness C is, the better the stability of coupling among the electrode, the conductive body 50, and a terminal of the terminal group 7 is. However, the thickness C can be appropriately adjusted in consideration of a manufacturing limit and the durability of the substrate.

The material of the input detection electrodes TDL of the present embodiment is not specifically limited, but electrodes containing metal with a light-shielding property are used in the present embodiment.

Even when the metal-containing electrode is constituted of fine lines in a mesh pattern, for example, the electrode can be electrically coupled across the height difference without disconnection in the present embodiment.

1-5. Method for Manufacturing Input Detection Device

Hereinafter, a method for manufacturing the input detection device 1 according to the present embodiment will be described.

The method for manufacturing the input detection device 1 according to the present embodiment includes a process for sticking the first substrate and the second substrate together with the sealing member 9, and a process for forming the electrode layers 71 on the main surface 31a and the side surface of the second substrate.

One of the features of the input detection device 1 according to the present embodiment is that when the electrode layers 71 are formed as input detection electrodes TDL on the main surface 31a of the second substrate, the electrode layers 71 are also formed on the side surface of the second substrate. The electrode layers 71 formed on the main surface 31a and on the side surface of the second substrate are preferably in the same layer.

Furthermore, the conductive body 50 that electrically couples the electrode layers 71 to the terminal group 7 disposed on the first substrate is formed on the electrode layers 71 formed on the side surface of the second substrate.

A spattering method can be employed as an exemplary method for forming electrodes on the side surface of the substrate.

As described above, the conductive body 50 is formed on the electrodes on the side surface of the second substrate. This configuration improves the stability of coupling among the electrode layers 71, the conductive body 50, and the terminal group 7.

The method for manufacturing the input detection device 1 according to the present embodiment is described in greater detail below. The method includes the following processes (a) to (e).

(a) A process for sticking the first substrate and the second substrate together with the sealing member 9;
(b) a process for forming a first concave portion 81 on the surface of the second substrate;
(c) a process for forming a second concave portion 82 on the second substrate by etching the second substrate including the first concave portion 81, the second concave portion 82 being the etched first concave portion 81;
(d) a process for forming the electrode layer 71 on the surface of the second substrate including the second concave portion 82; and
(e) a process for forming a cut surface 89 and an inclined surface 85 including a part of the second concave portion 82 by cutting the second substrate in the direction perpendicular to the second substrate along a line including the second concave portion 82.

Hereinafter, each of the processes will be described in detail.

Process (a)

In the present process, the first substrate that is the pixel substrate 21 and the second substrate that is the counter substrate 31 are stuck together with the sealing member 9. A display function layer such as the liquid crystal layer 4 is disposed between the first substrate and the second substrate. The liquid crystals of the liquid crystal layer 4 may be dropped before the sticking or may be injected after the sticking.

In the present embodiment, the first substrate is the pixel substrate 21, and the second substrate is the counter substrate 31. Alternatively, the first substrate and the second substrate may be another substrate such as a protective substrate.

The display function layer that is sealed between the substrates is not limited to the liquid crystal layer 4, and may be an arbitrary display function layer such as an organic EL layer.

Process (b)

In the present process, the first concave portion 81 is formed on the surface of the counter substrate 31 that is the second substrate.

Laser irradiation is preferably used as a method for forming the first concave portion 81.

Alternatively, for example, a scriber may be used to mechanically form the first concave portion 81.

At this time, the size or the depth of the first concave portion 81 can be controlled in the present process so that the counter substrate 31 with a desired thickness and the second concave portion 82 with a desired size are finally formed.

The first concave portion 81 may be formed only in a position where the inclined surface 85 is to be formed, or may be formed entirely on one side of the substrate along the height difference portion 8.

At least one or more first concave portions 81 are formed. A plurality of first concave portions 81 may be formed.

Process (c)

In the present process, the counter substrate 31 on which the first concave portion 81 is formed is etched. A wet etching method is preferable for the etching.

The counter substrate 31 made of glass is chemically etched with etching liquid. This etching thins the thickness of the counter substrate 31 and three-dimensionally and evenly sharpens the first concave portion 81 formed in the previous process. Then, the second concave portion 82 larger than the first concave portion 81 is formed on the surface of the counter substrate 31. The second concave portion 82 is etched into a hemispherical concave portion having a spherical surface inside.

At this time, the etching is controlled to prevent the second concave portion 82 from penetrating and puncturing the counter substrate 31.

At this time, a plurality of stacked second concave portions 82 may form the inclined surface 85.

In this process, the second concave portion 82 having a curved surface is uniformly formed. Meanwhile, even if the laser irradiation in the previous process develops a crack on the substrate, the etching process removes the crack. Thus, the counter substrate 31 with higher durability can be formed without developing a crack, in comparison with a method for mechanically cutting the substrate with a scriber, for example, to form an inclined surface.

When the first concave portion 81 is formed and foreign materials such as glass substances are scattered in the process (b), the etching process can remove the foreign materials. Thus, the conductivity of the electrode layer 71 is not reduced when the electrode layer 71 is formed in the next process.

The inclined surface 85 formed by the second concave portion 82 formed as described above can be controlled to become a predetermined inclined surface 85 that enhances the coupling reliability of the electrodes. The above-described control can be performed, for example, by controlling the size and depth of the initial concave portion formed in the process (b) and adjusting the etching conditions.

Process (d)

In the present process, the electrode layer 71 is formed on the counter substrate 31.

At this time, the electrode layer 71 is also formed on the surface of the second concave portion 82 in the same layer as that of the electrode layer 71 on the counter substrate 31. The electrode layer 71 can be formed in an arbitrary method such as evaporation and spattering.

The electrode layer 71 is patterned as necessary. The electrode layer 71 overlapping with the display region can be used as the input detection electrode TDL and the electrode layer 71 disposed in the frame region and on the inclined surface 85 of the second substrate can be used as output wiring of the input detection electrodes TDL.

Process (e)

In the present process, the second substrate is cut in the direction perpendicular to the substrate along a line including the second concave portion 82 so that the cut surface 89, and the inclined surface 85 including a part of the second concave portion 82 are formed.

In this process, the height difference portion 8 is constituted by the cut surface 89, the inclined surface 85, the first substrate, and the second substrate.

The cut surface 89 includes at least the counter substrate 31. The cut surface according to the present embodiment further includes the sealing member 9.

The inclined surface 85 is a surface formed by cutting the second concave portion 82.

At this time, the counter substrate 31 is preferably cut such that the deepest part of the second concave portion 82 formed on the counter substrate 31 is aligned with the above-described line.

Alternatively, the counter substrate 31 may be cut at a position outside the deepest part of the second concave portion 82, and wiring may be provided such that the conductive body 50 is embedded in the deepest part.

Conductive Body Forming Process (f)

In addition to the processes described above, the conductive body 50 can be formed by performing the process of forming the conductive body 50 so as to extend over at least the cut surface 89, the inclined surface 85, and a part of the surface of the first substrate.

At this time, the conductive body 50 is formed on the input detection electrode formed on the inclined surface 85.

A conductive body may be also formed on the main surface 31a of the counter substrate 31.

However, in the present embodiment, because the coupling stability of the electrodes is high, a conductive body is not necessarily formed on the main surface 31a of the counter substrate 31. In this case, the thickness of the conductive body can be eliminated.

Figure 17:
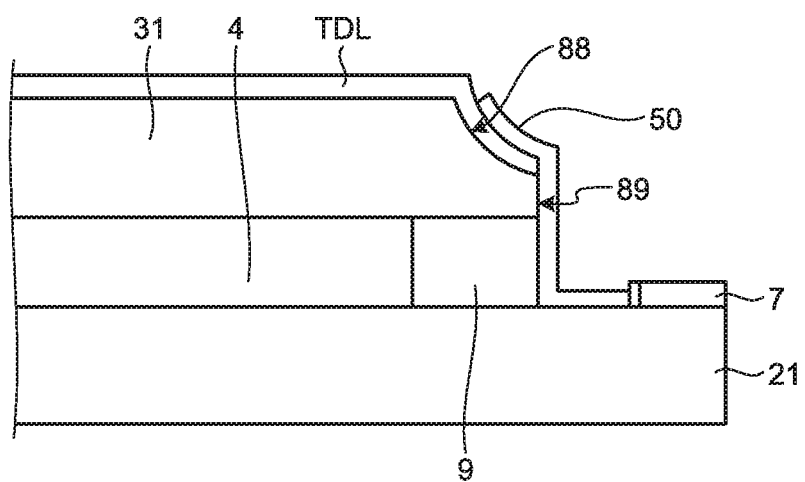
FIG. 17 is an enlarged view of the height difference portion.

FIGS. 15A to 15F are explanatory diagrams each illustrating a general outline of the manufacturing method according to the present embodiment. FIGS. 16A and 16B are perspective views of the input detection device after the conductive body is formed. FIG. 17 is an enlarged view of the height difference portion.

As illustrated in FIG. 17, a height difference is formed such that a part 88 of the second concave portion 82 is left at the end of the cut counter substrate 31.

As illustrated in FIG. 16A, the second concave portions 82 may be formed such that the entire side surface at the end of the counter substrate 31 does not form the inclined surface 85, and the inclined surface 85 is formed only in an arbitrary portion. As illustrated in FIG. 16B, the second concave portions 82 may be continuously formed such that the entire side surface forms the inclined surface 85.

The configuration of the second concave portions 82 can be controlled by adjusting the conditions of forming the first concave portion 81 and the etching conditions.

For example, a conductive liquid composition or a conductive viscous composition is discharged with a dispenser or the like, to form the conductive body 50.

For example, conductive paste such as silver paste can be employed as the conductive body 50.

The conductive paste discharged on the inclined surface 85 flows onto the pixel substrate 21 by gravity. This can reduce the short circuit of the wires using the paste.

At this time, the viscosity of the conductive paste can be adjusted as appropriate.

Wires using the conductive paste can be directly routed, for example, to a terminal on the FPC substrate coupled to the pixel substrate 21. However, another wire may be separately formed between the conductive paste and the terminal to couple them to each other.

According to the disclosure of the present embodiment as described above, it is possible to provide an input device that includes a small number of components, is thinned, is downsized, is excellent in design, and exhibits excellent performance for input detection. Furthermore, it is also possible to provide an input device that causes less cracks, has less foreign materials, and is excellent in durability and stability at the time of manufacturing.

In the input detection device of the present embodiment, because the electrode layer is also formed on the side surface of the second substrate constituting the height difference portion, the input detection device is excellent in coupling stability when the electrode on the second substrate is electrically coupled to the first substrate facing the second substrate.

Application of the present disclosure includes electronic apparatus such as various input devices, mobile phones, tablets, personal computers, digital cameras, televisions, and wearable devices including an electronic wristwatch.

The preferred embodiments of the present invention have been described above. However, the present invention is not limited to the embodiments. The contents disclosed in the embodiments are merely examples. The embodiments can be variously modified without departing from the gist of the present invention. The present invention naturally encompasses appropriate modifications maintaining the gist of the invention.

What is claimed is:

1. An input detection device comprising:
a first substrate;

a second substrate disposed to face the first substrate, the second substrate including a main surface having an area smaller than an area of a main surface of the first substrate; and a height difference portion disposed above the first substrate, wherein an electrode layer is disposed on the main surface of the second substrate at an opposite side to the first substrate, and on a side surface of the second substrate constituting the height difference portion, wherein the side surface of the second substrate includes an inclined surface, and the electrode layer is disposed on the main surface of the second substrate and on the inclined surface of the side surface of the second substrate as a same layer, wherein the inclined surface includes a curved surface, and wherein the electrode layer is disposed on a steep part of the inclined surface having the curved surface of a concave portion.

2. The input detection device according to claim 1, further comprising:

a terminal group arranged on the first substrate; and a conductive body that electrically couples the electrode layer and the terminal group, wherein the conductive body is disposed at least on the electrode layer that is disposed on the inclined surface.

3. The input detection device according to claim 2, wherein the conductive body is conductive paste including a metal component.

4. The input detection device according to claim 2, further comprising a sealing member that seals a portion between the first substrate and the second substrate, wherein the sealing member is disposed at least at a position where the sealing member overlaps with the electrode layer disposed on the inclined surface in the height difference portion in a planer view.

5. The input detection device according to claim 2, wherein a display function layer is disposed between the first substrate and the second substrate.

6. The input detection device according to claim 2, wherein the electrode layer includes a plurality of divided electrode patterns, and the width of the electrode pattern on the inclined surface is narrower than the width of the electrode pattern on the main surface of the second substrate.

7. The input detection device according to claim 2, wherein the electrode layer disposed on the main surface of the second substrate is an input detection electrode.

8. The input detection device according to claim 2, wherein the terminal group is electrically coupled to a touch detection circuit that receives a touch detection signal from the input detection electrode.

* * * * *